United States Patent [19]

Halvorsen

[11] 3,760,245
[45] Sept. 18, 1973

[54] MAGNETIC CONVEYER SYSTEM

[76] Inventor: Harold W. Halvorsen, 8600 16th St., 106, Silver Spring, Md. 20910

[22] Filed: Nov. 12, 1971

[21] Appl. No.: 198,162

[52] U.S. Cl............318/38, 16/93 D, 104/148 MS, 104/154, 160/340, 198/41, 198/DIG. 13, 310/11, 310/12, 310/18, 318/135
[51] Int. Cl. .......................................... H02k 45/00
[58] Field of Search .................. 310/11, 12, 13, 14, 310/18; 308/10; 318/38, 135; 104/147, 148 MS, 154, 155; 192/58; 198/20, 41, 129, DIG. 7, DIG. 13; 160/331, 340; 16/93 D, 87.2

[56] References Cited
UNITED STATES PATENTS

| | | |
|---|---|---|
| 1,441,250 | 1/1923 | Smith............................... 310/12 X |
| 2,645,279 | 7/1953 | Rossmann...................... 310/14 UX |
| 3,462,666 | 8/1969 | Martinek ......................... 308/10 X |
| 3,554,670 | 1/1971 | Starck et al...................... 198/41 X |
| 3,581,873 | 6/1971 | Spodik ................................ 198/41 |
| 3,632,229 | 1/1972 | Starck............................... 198/41 X |

*Primary Examiner*—J. D. Miller
*Assistant Examiner*—H. Huberfeld
*Attorney*—Laurence R. Brown

[57] ABSTRACT

A magnetic conveyer system includes a pump passing a magnetic fluid through a pipe path along which a carriage magnetically coupled to the moving fluid is conveyed by the fluid. The speed is varied along the path by changes of fluid cross section in the pipe. A drape traverse arrangement has a plurality of hooks moved to open or close the drapes as the direction of fluid flow is reversed.

18 Claims, 7 Drawing Figures

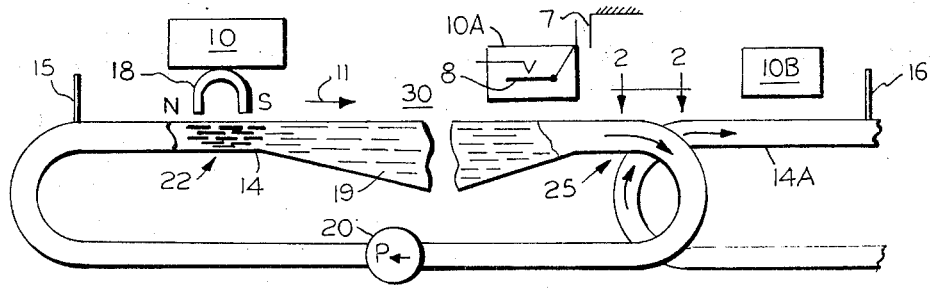
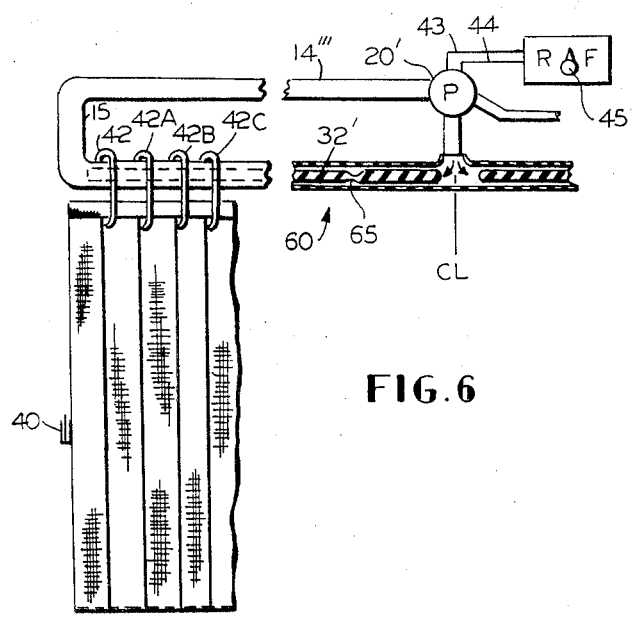
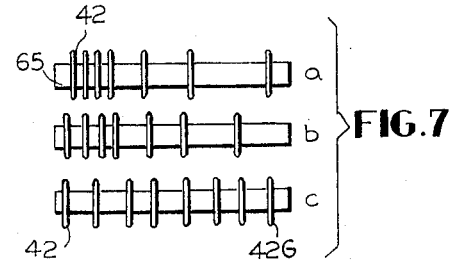
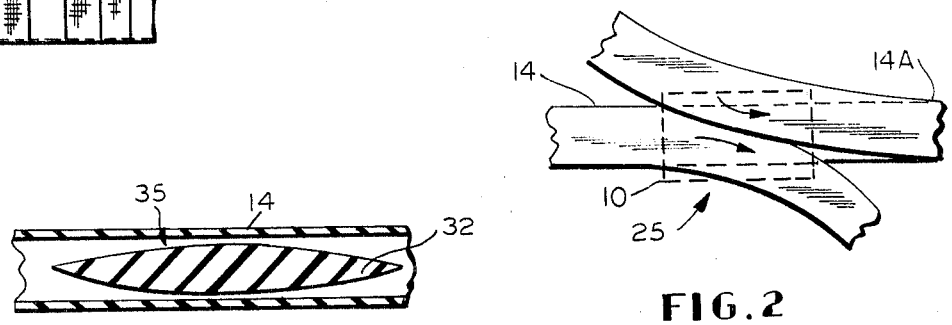
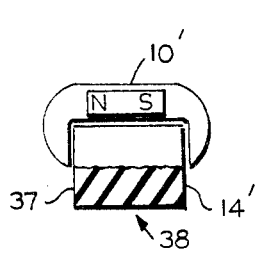
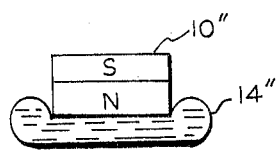
INVENTOR
HAROLD W. HALVORSEN
BY *Laurence R. Brown*
ATTORNEY

MAGNETIC CONVEYER SYSTEM

This invention relates to conveyer systems for transporting movable carriages linked to the conveyer medium and more particularly it relates to conveyer systems transporting movable carriages coupled to the conveyer medium at variable speeds along different portions of the conveyer path.

Mechanically connected conveyer systems are well known, where moving belts, chains or the like engage a carriage or body to move it from position to position, such as several stationary work stations along an assembly line, where separate functions are performed on the body. One problem with these conveyer lines is their inflexibility to changes of speed at different positions along the line such as at or approaching the work stations. It is desirable to move carriages rapidly between work stations and to slow down the carriages at the work station without disruptive acceleration or deceleration forces, collisions or changes of conveyer or coupling means.

Efficiency of the transport mechanism is a problem in conveyer systems that do not have rigid coupling to a conveyer medium. Other problems exist such as the power losses in the conveyer medium which limit the length of the conveyance path, or the smooth coupling or transition from one power source or one speed to another. Most conveyers do not permit the carriage means to brake, mark time or slip if it is stopped, jammed or held up, nor do they simply and effectively provide for automatic spacing of carriages from each other when they leave a work or approach a slow-down station.

If the foregoing problems are resolved it is then possible to utilize a conveyer system for many different kinds of applications. One of these embodiments would be a moving sidewalk where it is desirable to walk onto a platform when moving at slow speed and then be conveyed at high speeds to a destination walk off at a further fixed platform. Similarly the conveyed carriages could be automatically conveyed subway cars or the like that need no operators.

It is therefore a primary objective of this invention to provide improved conveying systems correcting deficiencies found in prior art devices.

A further object of the invention is to provide conveying means capable of significant differences of conveying speeds at different positions along a conveyer path.

Another object of the invention is to provide conveyance means which moves a plurality of carriages safely and smoothly without collisions through areas of widely contrasting conveyance speeds.

Other objects, features and advantages of the invention will be found throughout the following detailed description of specific embodiments of the invention as illustrated in the accompanying drawings, wherein:

FIG. 1 is a schematic elevation sketch of a conveyer system afforded by the invention, FIG. 2 is a top view of a portion of the view of FIG. 1, FIG. 3 is a fragment section-side view of a conveyer pipe construction as used in the invention, FIGS. 4 and 5 show end section views of various conveyer pipe embodiments, FIG. 6 shows an elevation sketch, partly in section, of drapery traverse means embodying the invention, and FIG. 7 is a sketch illustrating carriage distribution patterns achievable in accordance with the teachings of this invention.

FIG. 1 illustrates the basic construction techniques involved in the invention. Thus, carriages 10, 10A are carried in the direction of allow 11 along a path defined by non-magnetic piping in loops 14 or 14A from some start position 15 to a terminal position 16. The carriages may be passenger carrying cars in a subway type system which requires no operators, for example.

Each carriage 10 is magnetically coupled to the piping 14, 14A by suitable electro-magnetic means or permanent magnet illustrated by horseshoe magnet 18, and thus is conveyed or moved by the flow of a magnetic fluid 19 within the pipe which is conveyed by a suitable pump 20 which serves as the source of conveyance power. The magnetic fluid, which is preferably of low viscosity and non-flammable liquid, can comprise a colloidal suspension or mixture of a liquid carrying medium and ferromagnetic particles similar to those conventionally used in magnetic clutches. The fluid by magnetic coupling forces induces motion of the magnet 18 along the pipe path as a function of the fluid flow and fluid speed within piping 14. In non-homogeneous mixtures at least the magnet 18 will tend to bunch up the ferromagnetic particles with its magnetic field and cause a sort of plug 22 of concentrated magnetic particles and more viscous fluid to move as a unit within the piping, thus increasing the efficiency of flow and reducing slippage by a firm magnetic coupling action. However, it is to be noted that a carriage can be held stationary and the flow will continue so that the coupling is not so rigid as to cause damage to carriages which might be jammed, etc. The carriages 10 can be boxes for transporting parts, platforms for placing objects, cogs for engaging boxes, etc. as well as passenger carrying cabs or subway cars.

Since there are conveyance and friction losses in the piping, there is a limit to the length of the system coupled to each pump-power source 20, and thereby a transition between two pipe systems 14 and 14A having independent closed pipe loops may be effected, by overlapping the pipes in some manner such as that illustrated at juncture 25 in the respective elevation view of FIG. 1 and top view of FIG. 2. Thereby carriages pass between the two systems in a travel route network.

As may be seen by the arrows within pipes 14 and 14A, the direction of fluid travel is shown. If a carriage 10 is superimposed on the physical overlap portion of the pipe as shown in phantom in FIG. 2, it will be seen that the magnetic fluids in both overlapping pipe sections aids the continued travel of the carriage 10 to the right.

This thereby establishes a carriage route from the path of one piping system 14 to the path of another piping system 14A by means of a transition portion for changing the magnetic coupling of the carriage 10 from fluid in one loop to fluid in another loop.

This system in operation is quiet, maintenance free, efficient and offers other advantages described hereinafter of flexibility in stopping and slowing down movement of carriages, smooth transition from very low to very high carriage speeds, and automatic spacing of carriages at optimum rates. The change of speed from high speed sections of the pipe 14 where carriages 10 and 10B are shown and low speed sections where carriage 10A is shown is simply accomplished by application of principles of hydraulic flow. As the flow cross section within piping 14 is increased the flow speed decreases. For circular pipes this ratio is a function of $r^2$ where r is the radius. Thus if a pipe diameter is increased fivefold at a work station area 30, the speed ratio between carriage 10 and 10A is 25. In order to prevent hydraulic turbulence losses, and to provide smooth acceleration and deceleration the piping flow area is changed gradually by tapering.

Thus, the pipe dimensions may change as shown in FIG. 1, or may remain constant and have a tapered insert 32 as shown in FIG. 3. The piping is preferably non-conductive to avoid induction losses, and it is important to keep the pipe thickness at the magnetic coupling position as thin as feasible since the magnetic coupling linkage losses vary as the square of the distance between the conveyer liquid 19 and the magnet 18. Effectively therefore in a cylindrical pipe as illustrated in FIG. 3 the main magnetic coupling is near the outer circumference layer of the magnetic fluid, and the restriction plug 32 need not significantly disturb the magnetic coupling or fluid flow characteristics at the throat restriction area 35.

Piping can be constructed such as shown in FIGS. 4 and 5 to provide a railway or grooved path for the carriages. In FIG. 4, a substantially rectangular pipe may have wedges 37 inserted or may be indented on the bottom 38. A nylon or relative friction free bearing surface, wheels or other means may be used at the carriage-pipe interface to permit efficient movement of the carriages 10 along the piping 14.

In FIG. 6, a drapery 40 is illustrated coupled for movement along piping 14''' having tapered insert 32' therein. The drapery is magnetically coupled to the fluid in the pipe-traverse rod section 60 by means of magnetic carriages 42 having coupled thereto drapery hooks which traverse along the rod-pipe 60 between limits 15, 16 in opposing directions controlled by reversible flow pump 20'. Pump motor control wires 43, 44 are connected to a wall switch 45 with a central off position shown and momentary contact forward and reverse positions applying the power to the pump motor (not shown) in a manner to control the pumping direction of reversible pump 20'.

This embodiment illustrates several features of the invention such as reversible flow possibilities and the predetermined automatic spacing action between the carriages 42 to to 42n. In this respect the fluid cross section within the rod-pipe section 60 tapers by action of insert plug 32' to decrease in area continuously from the normally open drape position (leftward) to the normally closed drape position at the center line CL. Thus, in the position of the left hand drapery half illustrated, as the fluid flows from left to right the speed of flow increases to a maximum near center line CL. Note that the fluid moves each carriage-hook assembly 42 to 42c along the rod, but the movement force and speed of assembly 42c will be greater than that of 42A or 42B, etc. in the positions shown to thus ideally accomplish the unfolding and extension movement of drapery 40. If the load is high there may be frictional slippage of the carriages, but this causes no problems except transport efficiency which in this application need not be high. The taper of insert 32' can vary and even be notched as at 65 to effectively provide a camming or detent action at predetermined positions if desired. Thus the taper can be made to achieve spacing patterns such as shown in FIG. 7 which bunch the hooks at the left in FIG. 7a, taper the spacing as in FIG. 7b or evenly distribute the spacing as in FIG. 7c.

Assume, for example, that a ten foot drapery with ten movable hooks must close in ten seconds with even spacings between the hooks as shown in FIG. 7c. Then the innermost hook will average one foot per second over ten seconds or one foot per second, the next hanger will average 0.9 ft./sec., etc. and the taper of the pipe will be constructed accordingly. For this construction the following chart will show the design taper of the pipe cross section.

| Feet | Ave. Speed f.p.s. | Average Proportional Pipe Area |
| --- | --- | --- |
| First | 0.1 | 10 |
| 2nd | 0.2 | 5 |
| 4th | 0.4 | 2.5 |
| 8th | 0.8 | 1.25 |
| 10th | 1 | 1 |

Other tapers and conditions may also be considered in similar manner, and other variations and applications of the conveyance system afforded by this invention will occur to those skilled in the art.

This taper structure that provides acceleration and deceleration (changes of speed) also provides the function of collision free spacing of the carriages as they are accelerated along the high speed portion of the path. Similarly upon decleration, the spaced carriages are slowed down while separation between adjacent carriages is maintained so that any collisions if halted at a work station will occur only at very low transport speeds.

Should a carriage be held stationary for any reason, the flow of the magnetic fluid can continue ( with some inductive-viscous power loss) and the carriage will continue to start movement by the normal magnetic coupling action when freed. Thus, in an assembly line application a carriage may be held temporarily at a station frictionally and then released for further conveyance. This permits braking functions to be applied at one point in a system without removing the carriage from the conveyance path or closing down or significantly impeding the entire system flow and halting other carriages in the system as would be required in a cog-chain type conveyer belt system, for example. If desirable the magnetic coupling configuration can be made to cause the plug area 22 of higher viscosity afforded by the magnetic clutch phenomena to extend beyond the carriage and thus give a high viscosity cushion between two adjacent carriages that might approach each other to thereby prevent collision damage.

Should electromagnetic coupling be used, free wheeling effects can be introduced at will to decouple from the magnetic coupling path and permit the carriage motion to be independent from the magnetic fluid coupling. Thus, at a work station 30 (FIG. 1) a plurality of carriages could assemble for some work function without causing the magnetic fluid flow induction losses by an arrangement such as indicated for carriage 10A, which engages switch 8 with a switch stop arm 7 to open a self-contained electromagnetic circuit (not shown).

What is claimed is:

1. A conveyance system comprising in combination a magnetic fluid, piping means for said liquid defining a longitudinal path, means passing said fluid through said piping means, and movable carriage means magnetically coupled to said fluid to thereby move along said path at a speed determined by the rate of flow of said liquid through the piping system.

2. A conveyance system as defined in claim 1 having at least two separate piping means each comprising a pump and closed pipe loop, including a transition path for moving said carriage from magnetic coupling with the fluid in one loop to magnetic coupling with the fluid in the other loop thereby establishing a route from the path of one piping loop to the path of another.

3. A conveyance system as defined in claim 1 wherein said piping is non magnetic.

4. A conveyance system as defined in claim 1 wherein said piping is non electrically conductive.

5. A conveyance system as defined in claim 1 wherein the movable carriage means comprises a permanent magnet coupling member.

6. A conveyance system as defined in claim 1 wherein the movable carriage comprises an electromagnetic coupling member.

7. A conveyance system as defined in claim 1 wherein said pumping means is reversible to pass said fluid through said piping means in opposite directions.

8. A conveyance system as defined in claim 1 wherein said piping means along the length of said path has variable cross section areas whereby said fluid flows at different speeds and thereby said carriage means move at different speeds.

9. A conveyance system as defined in claim 8 wherein said variable cross section areas are formed by a member located within said piping means restricting the flow area.

10. A conveyance system as defined in claim 8 wherein said piping means comprises a pipe of variable internal cross section area to thereby produce said variable cross section areas.

11. A conveyance system as defined in claim 8 wherein the variable cross section areas are tapered thereby gradually providing a change of speed of flow.

12. A conveyance system as defined in claim 11 including at least two carriage means coupled to said path wherein said tapered cross section areas are tapered along at least a portion of the length of said path to produce different movement speeds to said two carriage means when dispersed along the tapered areas.

13. A conveyance system as defined in claim 8 wherein said carriage means comprises a series of spaced drapery hooks and said path comprises a drapery tranverse rod section, and said pump means passes the fluid selectively through the piping in opposite directions to thereby move said hooks back and forth along said traverse rod section.

14. A system as defined in claim 1 wherein the magnetic fluid is a mixture of a liquid and ferro-magnetic particles.

15. A conveyance system as defined in claim 14 wherein said coupling means includes a magnetic field region engaging said particles in said liquid thereby forming a movable plug within the piping system comprising a portion of said fluid of higher viscosity than that generally flowing within the piping means.

16. A conveyance system as defined in claim 15 having at least two separate spaced carriage means wherein said plug extends beyond the carriage to thereby provide a high viscosity cushion between two adjacent carriages that approach each other.

17. A conveyance system as defined in claim 1 wherein said carriage means comprises a series of spaced carriages moving along said path without operator controls.

18. A conveyance system as defined in claim 17 wherein said carriages are passenger carrying cars.

* * * * *